US008938873B2

(12) United States Patent
Kobayashi et al.

(10) Patent No.: US 8,938,873 B2
(45) Date of Patent: Jan. 27, 2015

(54) LEVER JIG AND CONNECTOR APPARATUS

(71) Applicant: Yazaki Corporation, Minato-ku, Tokyo (JP)

(72) Inventors: Naoki Kobayashi, Aichi (JP); Akihiro Tsuruta, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/023,550

(22) Filed: Sep. 11, 2013

(65) Prior Publication Data

US 2014/0024240 A1 Jan. 23, 2014

Related U.S. Application Data

(63) Continuation of application No. PCT/JP2012/056587, filed on Mar. 14, 2012.

(30) Foreign Application Priority Data

Mar. 16, 2011 (JP) ................................ 2011-058089

(51) Int. Cl.
*B23P 19/00* (2006.01)
*H01R 43/00* (2006.01)
*H01R 43/20* (2006.01)
*H01R 13/629* (2006.01)

(52) U.S. Cl.
CPC .......... *H01R 43/20* (2013.01); *H01R 13/62938* (2013.01); *H01R 13/62955* (2013.01)
USPC .................. 29/750; 29/752; 29/754; 29/758; 29/764

(58) Field of Classification Search
CPC .................. H01R 13/62944; H01R 13/62955; H01R 13/6277; H01R 13/62938; H01R 13/6295; H01R 13/62966
USPC .................. 29/750, 747, 752, 754, 758, 764; 439/157, 296, 347, 372
See application file for complete search history.

(56) References Cited

U.S. PATENT DOCUMENTS 3,177,567 A 4/1965 Gehrman
8,439,695 B2 * 5/2013 Komiyama .................. 439/157
2009/0203240 A1 8/2009 Matsumura et al.

FOREIGN PATENT DOCUMENTS

JP H5-182739 A 7/1993
JP 2009-187863 A 8/2009

(Continued)

OTHER PUBLICATIONS

Korean office action issued on Jul. 29, 2014 in the counterpart Korean patent application.

*Primary Examiner* — Thiem Phan
(74) *Attorney, Agent, or Firm* — Marvin A. Motsenbocker; Mots Law, PLLC

(57) ABSTRACT

A lever jig is mounted on a female connector and fits a female connector and a male connector by an operation from a fitting-operation start position to a fitting-operation completion position so as to move the female connector and the male connector from the fitting-operation start position to the fitting-operation completion position. The lever jig includes a connector hold portion that moves between a holding position and a holding release position for the female connector, and a lever body that is operated between the fitting-operation start position and the fitting-operation completion position. In a section from the fitting-operation start position to a position just before the fitting-operation completion position for the lever body, the connector hold portion moves to the holding position, and in the fitting-operation completion position for the lever body, the connector hold portion 3 moves to the holding release position.

9 Claims, 15 Drawing Sheets

(56) References Cited

FOREIGN PATENT DOCUMENTS

| | | | |
|---|---|---|---|
| JP | 2011-150934 | A | 8/2011 |
| JP | 2011-159574 | A | 8/2011 |
| JP | 2011-258324 | A | 12/2011 |

* cited by examiner

LEVER JIG AND CONNECTOR APPARATUS

CROSS REFERENCE TO RELATED APPLICATION

This is a continuation application based on PCT application No. PCT/JP2012/56587 filed on Mar. 14, 2012, which claims the benefit of priority from Japanese Patent Application No. 2011-058089 filed on Mar. 16, 2011, the entire contents of which are incorporated by reference herein.

BACKGROUND OF THE INVENTION

1. Field of the Invention

The present invention relates to a lever jig which fits a pair of connectors each other with weak operational force and a connector apparatus using the same.

2. Description of the Related Art

There have been proposed various connector apparatuses each of which fits a pair of connectors by operating a lever with weak operational force (for example, see Japanese Patent Application Laid-Open Publication No. 2009-187863). Among these connector apparatuses, there is proposed one having a lever to be detachably provided on a connector, that is, as a lever jig. With the lever jig, it is possible to perform the fitting operation for a plurality of connector apparatuses, thereby aiming at reduction of the cost of parts, etc. A conventional example of the lever jig and the connector apparatus using the same is shown in FIGS. 1 to 4. Description will be made below.

A connector apparatus 100 has, as shown in FIG. 1, a lever jig 101, and a female connector 120 and a male connector 130 which are a pair of connectors.

The lever jig 101 has, as shown in detail in FIG. 2, a connector mount portion 102 and a lever body 110 rotatably supported by the connector mount portion 102. The connector mount portion 102 has a pair of side walls 103 and a connecting wall part 104 which connects the pair of side walls 103. On the upper ends of the pair of side walls 103, there are provided upper stopper pieces 103*a* protruding inside each other.

Inside the pair of side walls 103, the female connector 120 can be inserted from the bottom side. On the pair of side walls 103, there are provided connector engagement tabs 105 protruding inside, at a plurality of places, respectively. On the outer surfaces of the pair of side walls 103, there is provided a pair of support pins 106 in a protruding manner. On the pair of side walls 103, there are provided a pair of temporary engagement holes 107 and guide slits 108 communicated with the temporary engagement holes 107. On the pair of side walls 103 and on the lower parts of the temporary engagement holes 107, there are provided lever stopper parts 109 in a protruding manner.

The lever body 110 is provided with a pair of arm parts 111 and an operational part 112 which connects the pair of arm parts 111 at the tips thereof. On the inner surface sides of the pair of arm parts 111, there is provided a pair of pin reception holes 113. To the pair of pin reception holes 113, the support pins 106 of the connector mount portion 102 are inserted, respectively. This enables the lever body 110 to be operated for rotation around the pair of support pins 106 between a fitting-operation start position and a fitting-operation completion position. Inside the pair of arm parts 111, there is provided a pair of boss introduction grooves 114. The pair of arm parts 111 is provided with temporary engagement tabs 115 protruding inside, respectively. The lever body 110 has the temporary engagement tabs 115 engaged to the temporary engagement holes 107 in a position to hit the lever stopper parts 109. The position is the fitting-operation start position for the lever body 110 (see FIG. 1).

As shown in FIG. 1, the female connector 120 and the male connector 130 are provided to be fittable and removable each other. Both of the female connector 120 and the male connector 130 have multiple terminals (not shown) and the mutual multiple terminals (not shown) come in contact in a fitted state. On the upper part of the female connector 120, there are provided flange parts 121 protruding from the both side surfaces thereof. The male connector 130 has a connector fit chamber 131 with its upper part opened. On the both side surfaces of the male connector 130, there are provided a pair of boss parts 132 and a pair of temporary-engagement release guide ribs 133 in a protruding manner.

Next, fitting operation of the female connector 120 and the male connector 130 will be described. The lever body 110 of the lever jig 101 is supposed to be set in the fitting-operation start position. First, from the bottom side of the connector mount portion 102 of the lever jig 101, the female connector 102 is inserted. When inserted in a complete-insertion position, the connector engagement tabs 105 of the connector mount portion 102 are engaged to the flange parts 121 of the female connector 120, thereby connecting the lever jig 101 and the female connector 120.

Next, the female connector 120 is inserted into the connector fit chamber 131 of the male connector 130. Then the temporary-engagement release guide ribs 133 of the male connector 130 move the temporary engagement tabs 115 to a release position, thereby allowing the lever body 110 to be operated for rotation. Also, the pair of boss parts 132 of the male connector 130 is introduced to the pair of boss introduction grooves 114 of the lever body 110, thereby setting the female connector 120 and the male connector 130 in a fitting start position.

Next, the lever body 110 is operated for rotation from the fitting-operation start position to the side of the fitting-operation completion position. Then the pair of boss parts 132 of the male connector 130 moves through the pair of boss introduction grooves 114 of the lever body 110, so that the male connector 130 is drawn toward the female connector 120. That is, the male connector 130 moves to the fitting position side. As shown in FIGS. 3 and 4, the lever body 110 has its rotational operation proceeded to come close to the fitting-operation completion position, so that the upper right-and-left ends of the male connector 130 hit the connector engagement tabs 105 of the connector mount portion 102. The lever body 110 is further rotated from this state to the fitting-operation completion position, so that the male connector 130 is drawn to the fitting-operation completion position and each of the connector engagement tabs 105 is moved to the release position. This is the completion of the fitting operation of the female connector 120 and the male connector 130. Since each of the connector engagement tabs 105 is moved to the release position, it is possible to remove the lever jig 101 from the female connector 120.

However, for the above-noted conventional lever jig 101 and the connector apparatus 100 using the same, if the female connector 120 and the male connector 130 incline in a relative position during the fitting operation, a connector engagement tab 105 on a side where deeply drawn is moved to the release position in a position before the fitting-operation completion position. If a part of the connector engagement tabs 105 is moved to the release position, the lever jig 101 becomes detachable from the female connector 120. Accordingly, there is a risk of detaching the lever jig 101 from the female connector 120 in a half-fitted state between the female connector 120 and the male connector 130.

SUMMARY OF THE INVENTION

In view of the foregoing problem, the present invention has an object to provide a lever jig and a connector apparatus using the same, which surely prevents a detachment in a half-fitted state between a pair of connectors.

The present invention provides a lever jig which is mounted on one of a pair of connectors and causes fitting force to act on the pair of connectors by an operation from a fitting-operation start position to a fitting-operation completion position so as to move the pair of connectors from a fitting start position to a fitting completion position, the lever jig comprising: a connector hold portion that moves between a holding position to hold one of the connectors and a holding release position to release one of the connectors from holding; and a lever body that is movably supported by the connector hold portion and operated between the fitting-operation start position and the fitting-operation completion position, wherein the connector hold portion moves in accordance with an operational position of the lever body, and in a section between the fitting-operation start position and a position just before the fitting-operation completion position for the lever body the connector hold portion moves to the holding position and in the fitting-operation completion position for the lever body the connector hold portion moves to the holding release position.

The connector hold portion includes one which is configured to include a pair of movable hold parts that moves between the holding position with a narrowed distance between each other and the holding release position with a broadened distance between each other, and an urging means to urge the pair of movable hold parts to the side of the holding release position, wherein the lever body has a pair of arm parts movably supported by the pair of movable hold parts, respectively, both in the holding position and in the holding release position, and the pair of arm parts has first contact faces and second contact faces formed thereon, respectively, to which the pair of movable hold parts comes into contact by the action of urged force of the urging means, wherein in a section between the fitting-operation start position and the position just before the fitting-operation completion position for the pair of arm parts, the pair of movable hold parts contacts with the first contact faces to keep the holding position, and in the fitting-operation completion position for the pair of arm parts, the pair of movable hold parts contacts with the second contact faces, thereby moving from the holding position to the holding release position.

Another of the present invention provides a connector apparatus comprising: a pair of connectors to be mutually fittable; and a lever jig which is mounted on one of the pair of connectors and causes fitting force to act on the pair of connectors by an operation from an operation start position to an operation completion position so as to move the pair of connectors from a fitting start position to a fitting completion position, wherein one of the connectors is provided to be held by the lever jig and detached from a held state, wherein the lever jig includes a connector hold portion that moves between a holding position to hold one of the connectors and a holding release position to release one of the connectors from holding, and a lever body that is movably supported by the connector hold portion and operated between a fitting-operation start position and a fitting-operation completion position, wherein the connector hold portion moves in accordance with an operational position of the lever body, and in a section between the fitting-operation start position and a position just before the fitting-operation completion position for the lever body the connector hold portion moves to the holding position and in the fitting-operation completion position for the lever body the connector hold portion moves to the holding release position.

According to the present invention, a lever body of a lever jig is operated from a fitting-operation start position to a fitting-operation completion position, a connector hold portion keeps a holding position during operation from the fitting-operation start position to a position just before the fitting-operation completion position, and the connector hold portion moves to a holding release position only after the completion of operation to the fitting-operation completion position, thereby the lever jig becomes detachable from one of connectors. Accordingly, the detachment is not possible in a half-fitted state between a pair of connectors, thereby surely preventing the detachment in the half-fitted state between the pair of connectors.

DESCRIPTION OF THE EMBODIMENTS

An embodiment of the present invention will be described below with reference to the drawings.

Figure 1:
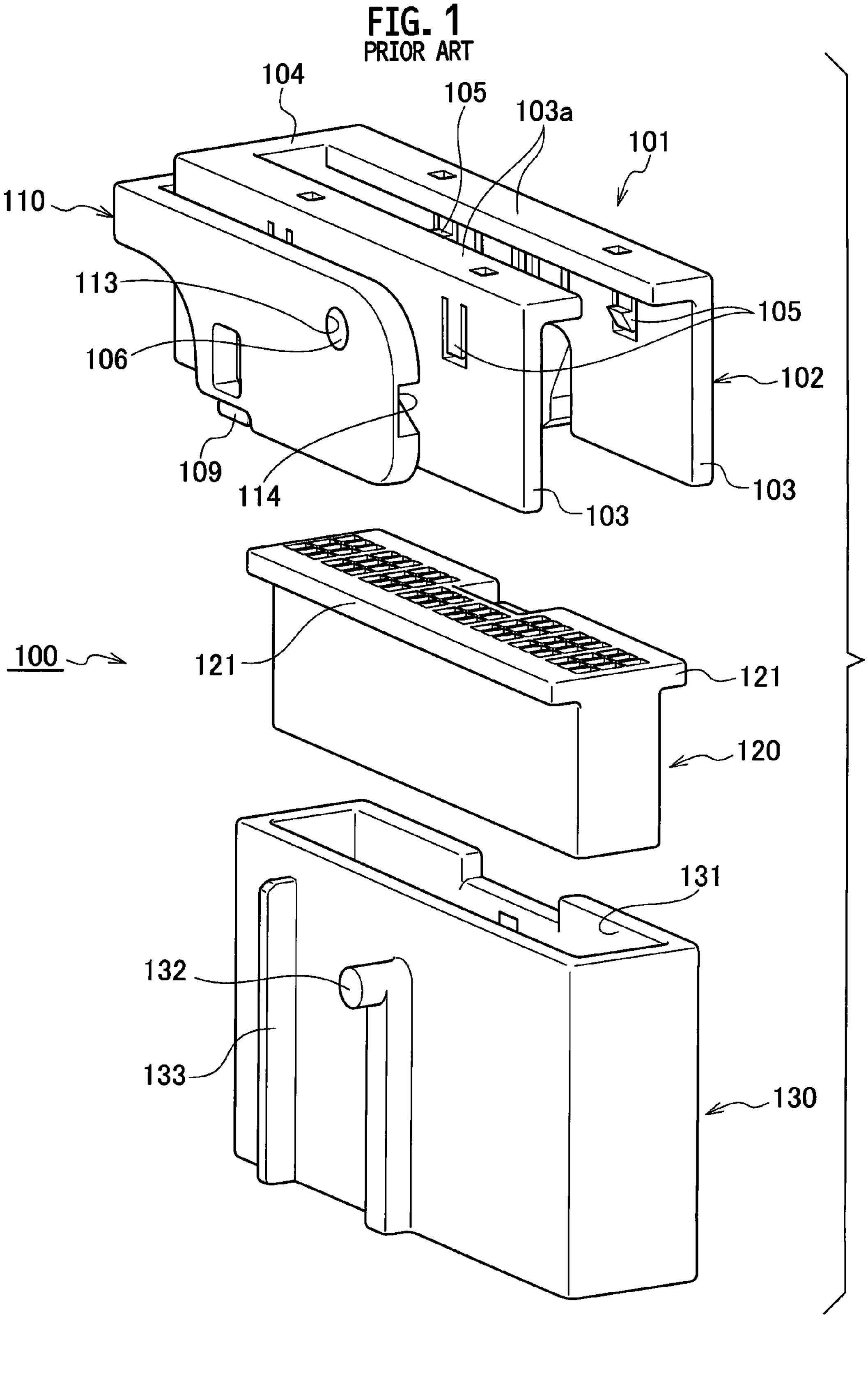
FIG. 1 PRIOR ART
FIG. 1 is an exploded perspective view of a connector apparatus, showing a conventional example.
Figure 2:
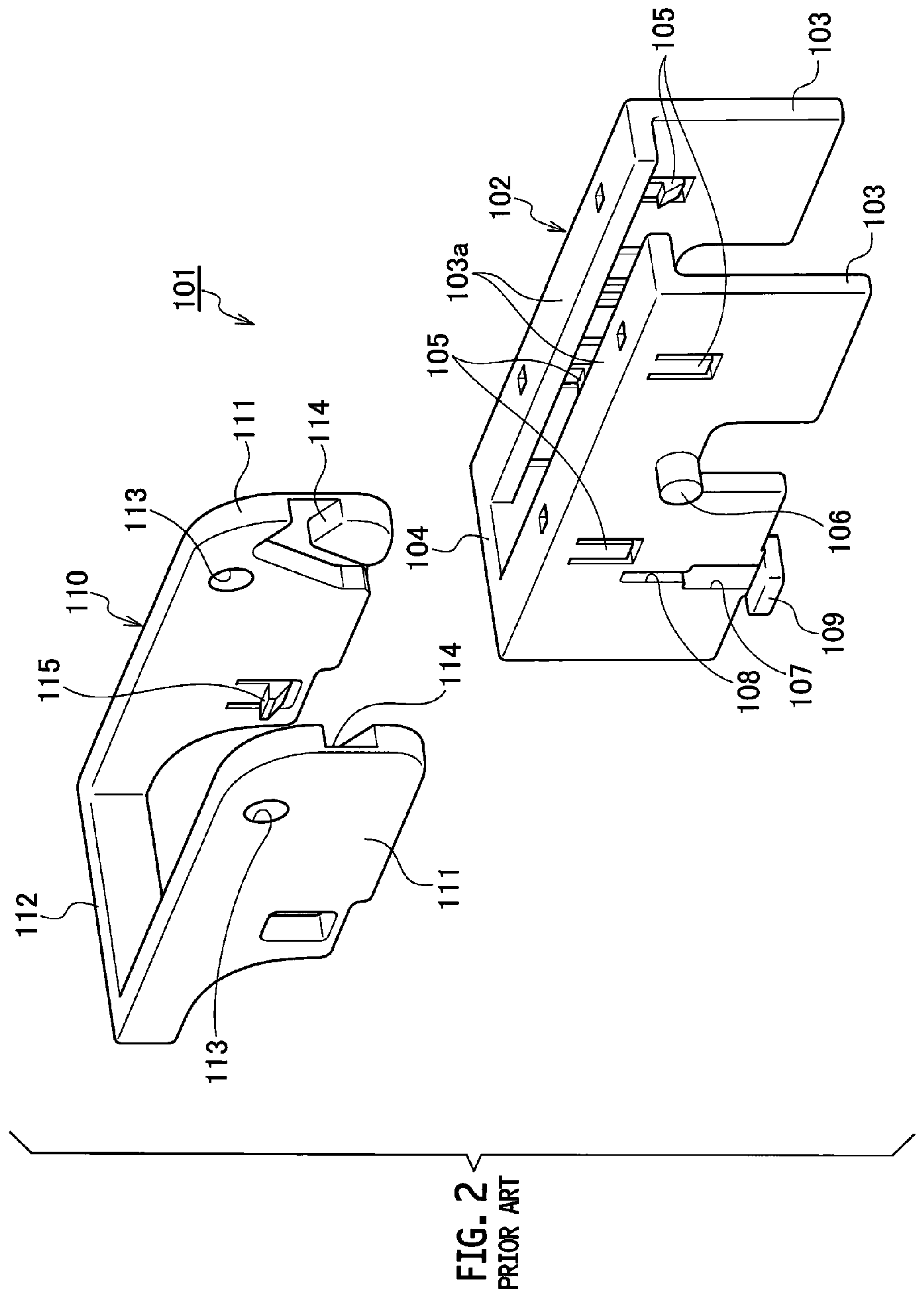
FIG. 2 PRIOR ART
FIG. 2 is an exploded perspective view of a lever jig, showing the conventional example.
Figure 3:
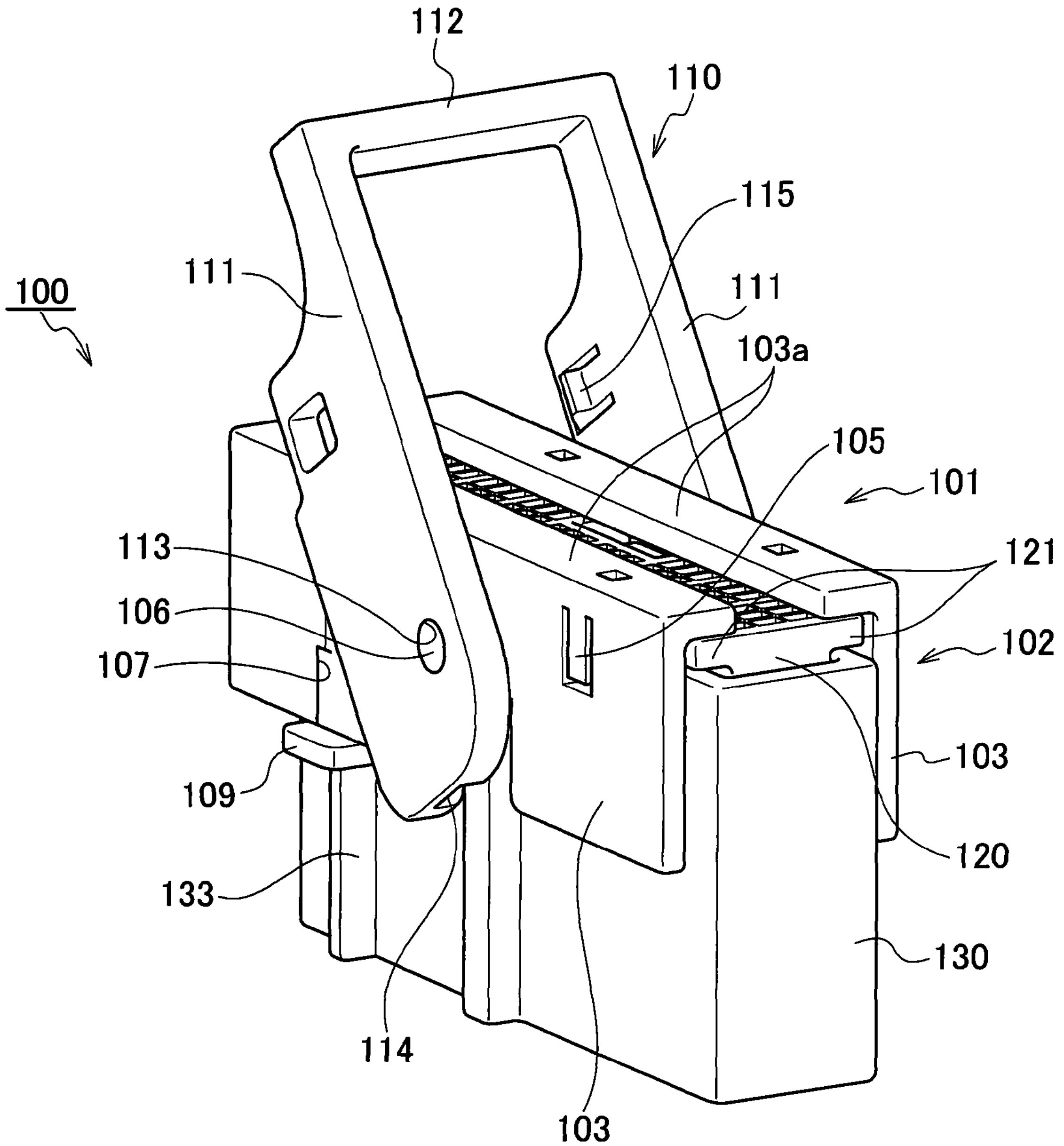
FIG. 3 PRIOR ART
FIG. 3 is a perspective view showing a process of connector fitting work, showing the conventional example.
Figure 4:
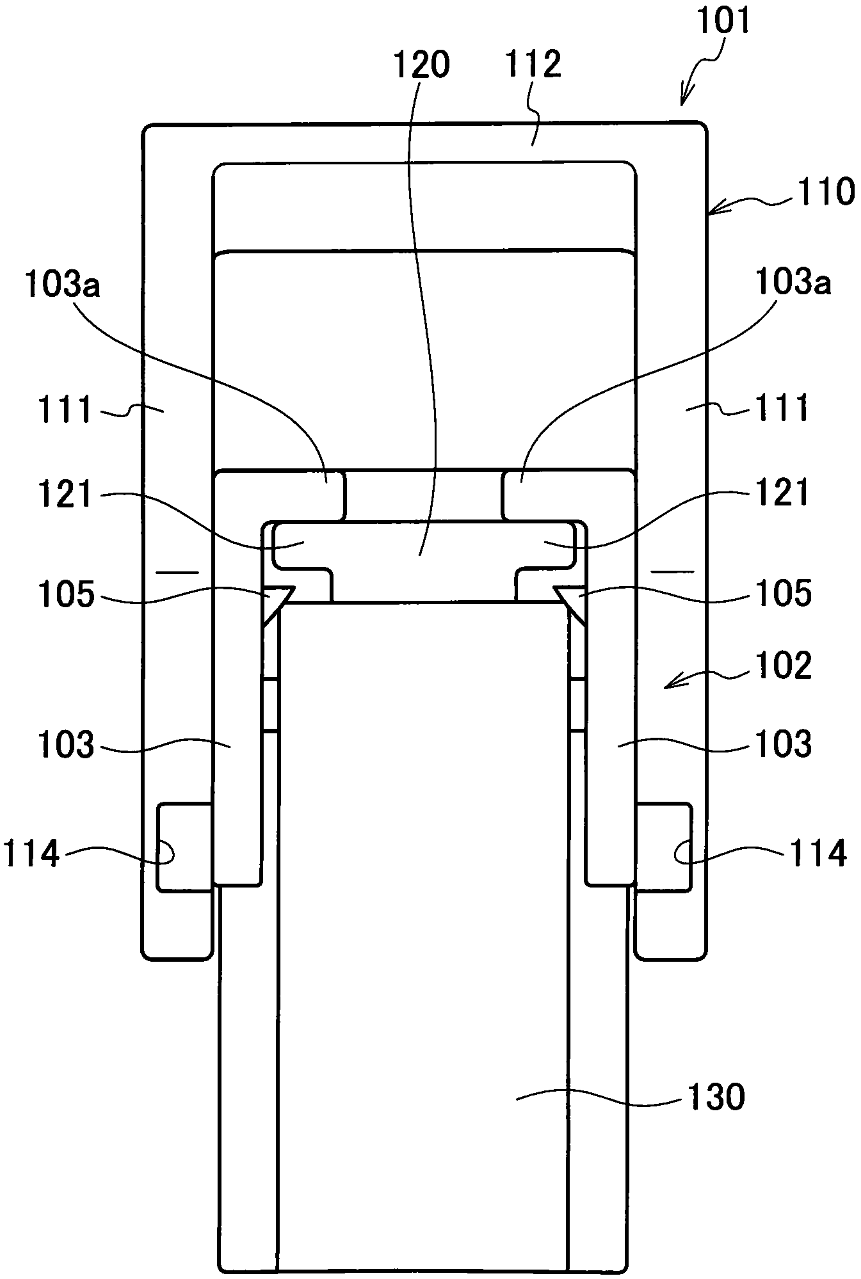
FIG. 4 PRIOR ART
FIG. 4 is a side view showing a process of the connector fitting work, showing the conventional example.
Figure 5:
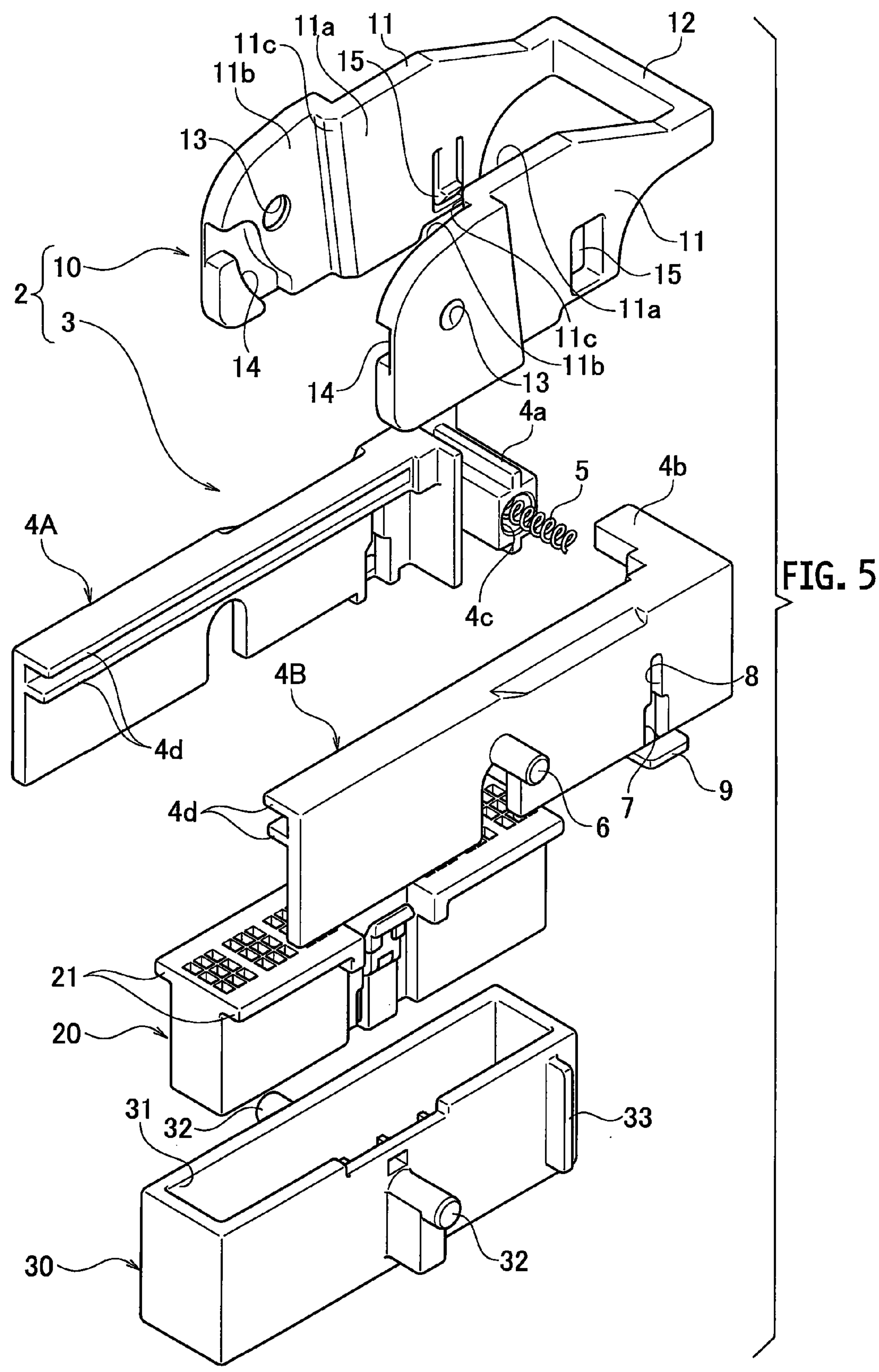
FIG. 5 is an exploded perspective view of a connector apparatus, showing one embodiment of the present invention.

FIGS. 5 to 15 show one embodiment of the present invention. As shown in FIG. 5, a connector apparatus 1 has a lever jig 2, and a female connector 20 and a male connector 30 which are a pair of connectors.

The lever jig 2 has a connector hold portion 3 and a lever body 10 rotatably supported by the connector hold portion 3.

Figure 6:
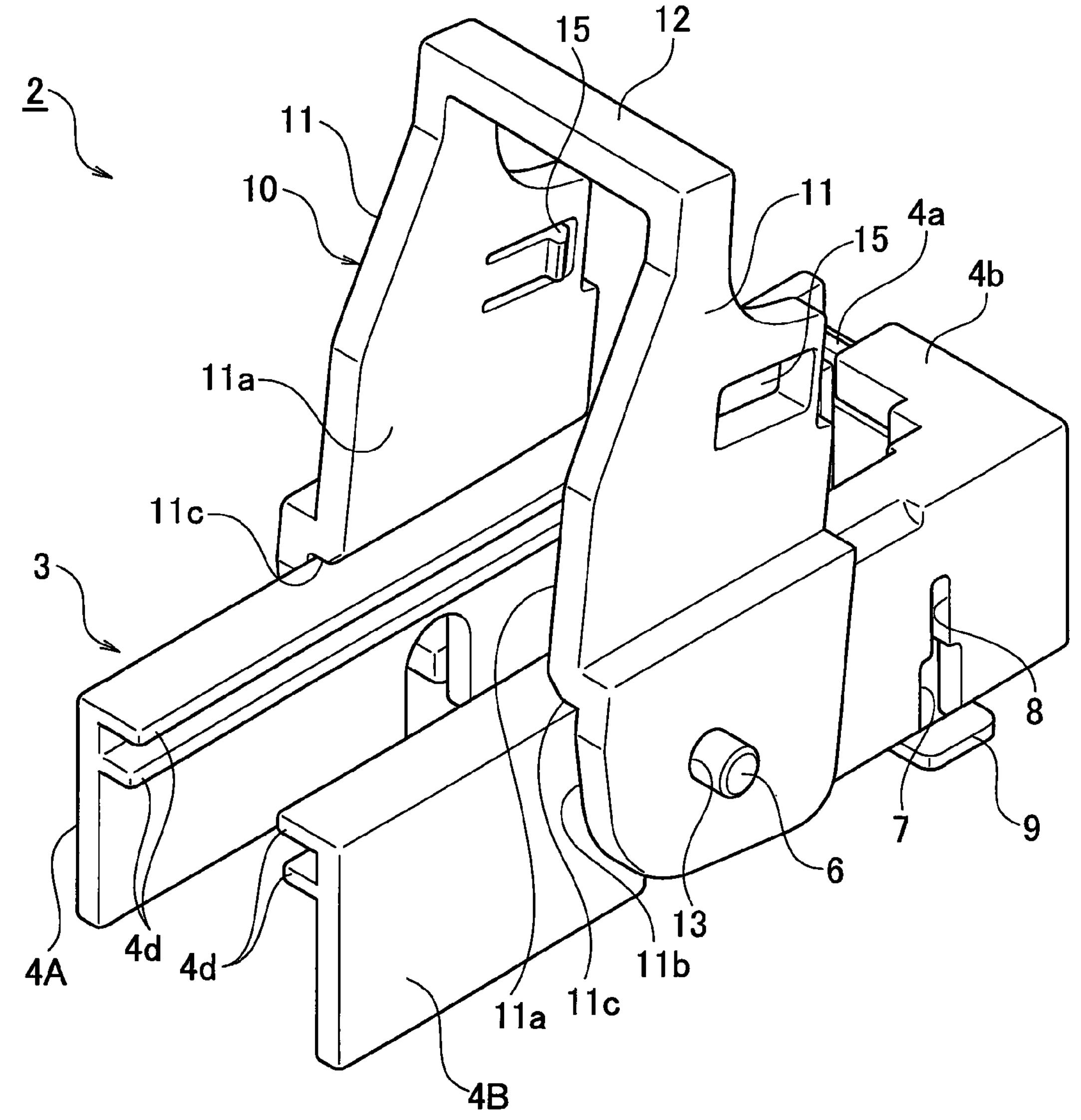
FIG. 6 is a perspective view of a lever jig, showing one embodiment of the present invention.
Figure 7:
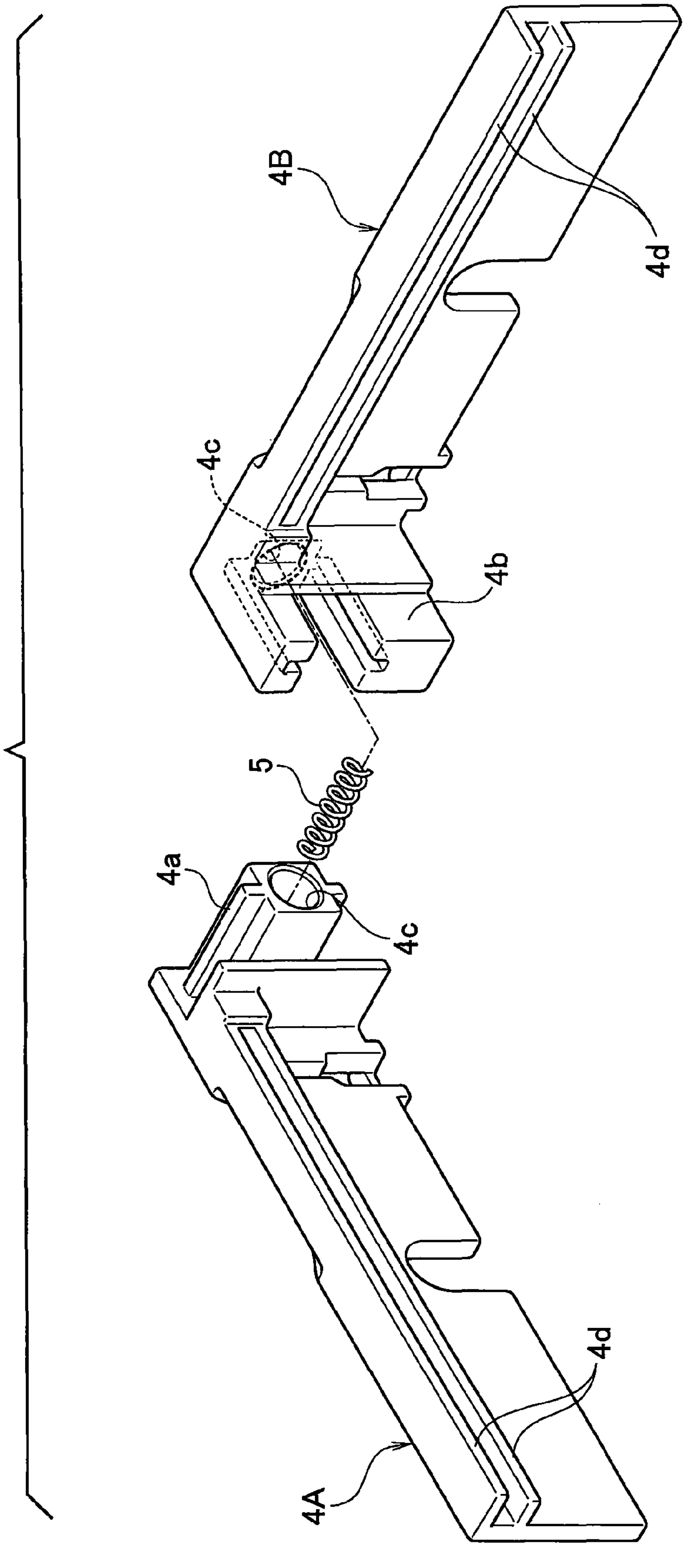
FIG. 7 is a perspective view of an essential part of a connector mount portion of the lever jig, showing one embodiment of the present invention.

The connector hold portion 3 has, as shown in FIGS. 5 to 7, a pair of movable hold parts 4A and 4B, and a coil spring 5 as an urging means. The pair of movable hold parts 4A and 4B has protruding connection parts 4*a* and 4*b* to be slidably connected each other. The pair of movable hold parts 4A and 4B has a sliding movement between the protruding connection parts 4*a* and 4*b*, thereby moving in a direction to broaden a distance between each other and in a direction to narrow a distance between each other. With the movement, the pair of movable hold parts 4A and 4B moves in accordance with the following operational position of the pair of arm parts 11 of the lever body 10, to a holding position to hold the female connector 20 with a narrowed distance between each other and to a holding release position to release the female connector 20 from holding with a broaden distance between each other. Mechanism of movement of the pair of movable hold parts 4A and 4B in accordance with the operational position of the pair of arm parts 11 will be described below.

Both of the protruding connection parts 4*a* and 4*b* have spring reception holes 4*c* formed on their opposing faces, respectively. To the both spring reception holes 4*c*, the coil spring 5 is received. The coil spring 5 urges in a direction to broaden the distance between the pair of movable hold parts 4A and 4B, that is a holding release direction.

On the inner surface sides of the pair of movable hold parts 4A and 4B, there are provided a pair of two lines of protruding clamp parts 4*d* in a protruding manner. The pair of protruding clamp parts 4*d* is formed along the total length of each of the movable hold parts 4A and 4B. On the outer surfaces of the pair of movable hold parts 4A and 4B, there is provided a pair of support pins 6 in a protruding manner. The pair of support pins 6 is set to a long dimension enough to keep an inserted-state in pin reception holes 13 of the lever body 10, both in the holding position and in the holding release position for the movable hold parts 4A and 4B.

The pair of movable hold parts 4A and 4B is provided with a pair of temporary engagement holes 7 and guide slits connected to the temporary engagement holes 7, respectively. On the outer surfaces of the pair of movable hold parts 4A and 4B, there are provided lever stopper parts 9 in a protruding manner, below the temporary engagement holes 7.

Figure 8:
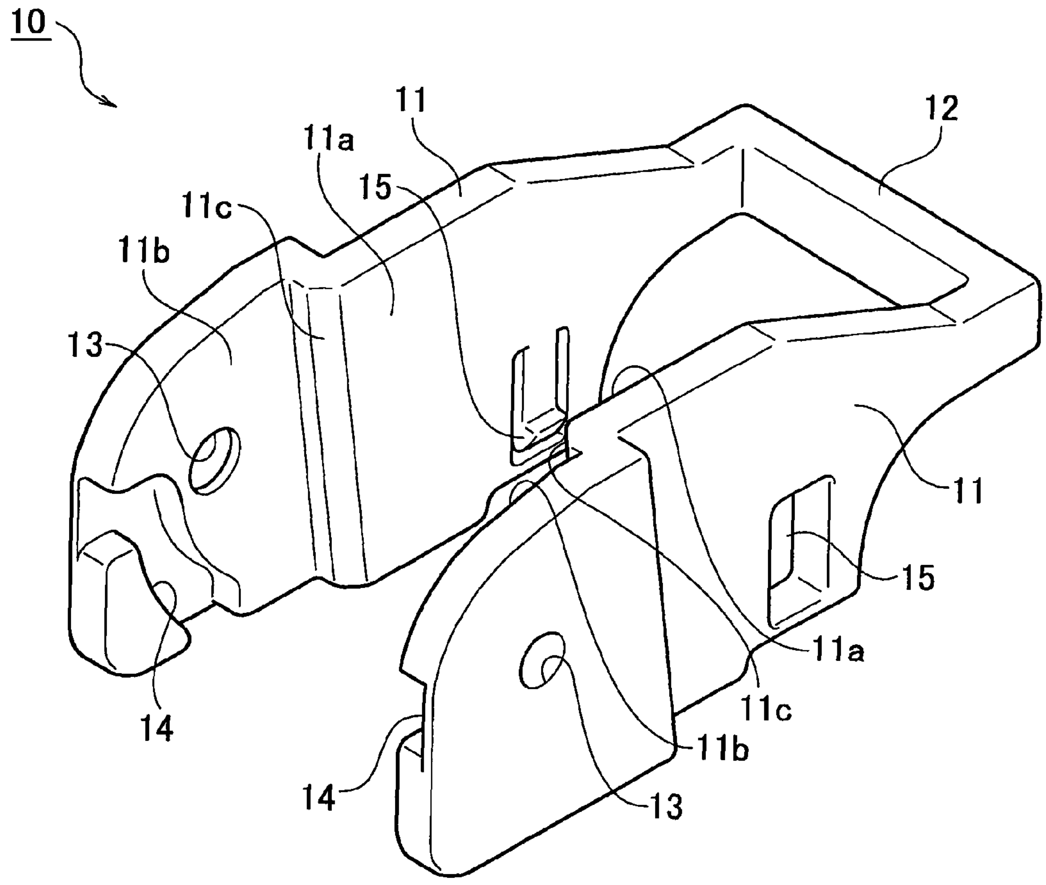
FIG. 8 is an exploded perspective view of a lever body of the lever jig, showing one embodiment of the present invention.

The lever body 10 includes, as shown in FIGS. 5, 6 and 8, the pair of arm parts 11 and an operational part 12 which connects the pair of arm parts 11 at the tips thereof. On the inner surface sides of the pair of arm parts 11, there is provided the pair of pin reception holes 13. To the pair of pin reception holes 13, each of the support pins 6 of the connector hold portion 3 is inserted, thereby allowing the lever body 10 to be operated for rotation around the pair of support pins 6 between a fitting-operation start position and a fitting-operation completion position. Inside the pair of arm parts 11, there is provided a pair of boss introduction grooves 14. Each of the boss introduction grooves 14 opens toward a directly below position in the fitting-operation start position and in the fitting-operation completion position for the lever body 10. That is, in the fitting-operation start position and in the fitting-operation completion position for the lever body 10, boss parts 32 of the male connector 30 which will be described later, can be inserted to and removed from the boss introduction grooves 14.

The pair of arm parts 11 is respectively provided with temporary engagement tabs 15 protruding inside. The lever body 10 has the temporary engagement tabs 15 engaged to the temporary engagement holes 7 in a position to hit the lever stopper parts 9. The position is the fitting-operation start position for the lever body 10 (see FIGS. 10 and 11).

To the pair of arm parts 11, outer surfaces of the pair of movable hold parts 4A and 4B contact by the action of spring force of the coil spring 5. The pair of arm parts 11 includes a pair of first contact faces 11*a* having a narrowed distance between each other and a pair of second contact faces 11*b* having a broaden distance between each other. In a position to contact with the pair of first contact faces 11*a*, the pair of movable hold parts 4A and 4B is located in the holding position. In a position to contact with the pair of second contact faces 11*b*, the pair of movable hold parts 4A and 4B is located in the holding release position. Between the first contact faces 11*a* and the second contact faces 11*b*, there are provided difference faces 11*c* which are approximately right-angled. From the fitting-operation start position to a position just before the fitting-operation completion position for the pair of arm parts 11, the pair of movable hold parts 4A and 4B has at least respective parts thereof contact with the first contact faces 11*a*, to be in a connector holding position (FIGS. 10 to 13), and in the fitting-operation completion position for the pair of arm parts 11, the pair of movable hold parts 4A and 4B comes off the first contact faces 11*a* and at the same timing has all the faces come into contact with the second contact faces lib so as to instantly move from the connector holding position to a connector holding release position (see FIG. 14).

As shown in FIG. 5, the female connector 20 and the male connector 30 are provided to be fittable and removable each other. Both of the female connector 20 and the male connector 30 have multiple terminals (not shown) and the mutual multiple terminals (not shown) come in contact in a fitted state.

On the upper parts of the both side surfaces of the female connector 20, there is provided a pair of protruding parts 21 in a protruding manner. Two lines of protruding parts 21 are provided along the total length of the side surfaces of the female connector 20. The protruding parts 21 on both sides are positioned so as to be inserted between the two lines of protruding clamp parts 4*d* of the pair of movable hold parts 4A and 4B, so that the female connector 20 is held with the connector hold portion 3. The clamp configuration enables the connector hold portion 3 to firmly hold the female connector 20.

The male connector 30 has a connector fit chamber 31 with its upper part opened. On the both side surfaces of the male connector 30, there is provided a pair of boss parts 32 in a protruding manner. On the both side surfaces of the male connector 30, there is provided a pair of temporary-engagement release guide ribs 33 protruding along the lateral direction thereof.

Figure 9:
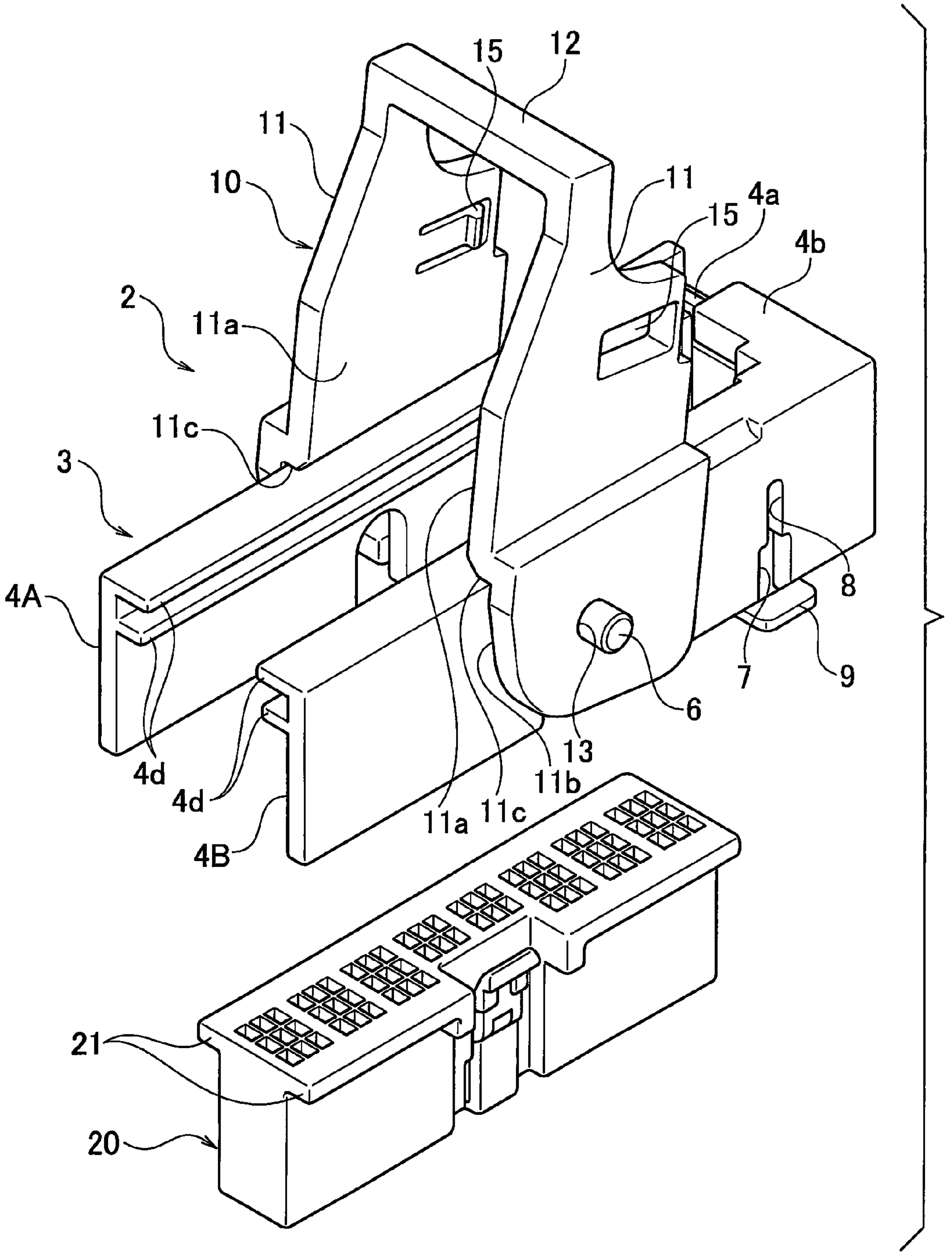
FIG. 9 is a perspective view showing a process of connector fitting work, showing one embodiment of the present invention.

Next, the fitting operation of the female connector 20 and the male connector 30 will be described. As shown in FIG. 9, the lever jig 2 has the lever body 10 positioned in the fitting-operation completion position and the connector hold portion 3 positioned in the holding release position. The female connector 20 is to be located in a space between the pair of movable hold parts 4A and 4B. Then, while the right and left protruding parts 21 of the female connector 20 are positioned to be inserted in the two lines of the protruding clamp parts 4*d* of the movable hold parts 4A and 4B, the lever body 10 is operated for rotation to the side of the fitting-operation start position. Here, in the fitting-operation completion position for the lever body 10, the top edges of the pair of movable hold parts 4A and 4B contact with the difference faces 11*c* of the pair of arm parts 11. Accordingly, the pair of movable hold parts 4A and 4B gets over the difference faces 11*c*, thereby the lever body 10 rotates to the fitting-operation start position. The pair of movable hold parts 4A and 4B gets over the difference faces 11*c* to change contact faces to the first contact faces 11*a*, thereby the pair of movable hold parts 4A and 4B is moved to the holding position.

Figure 10:
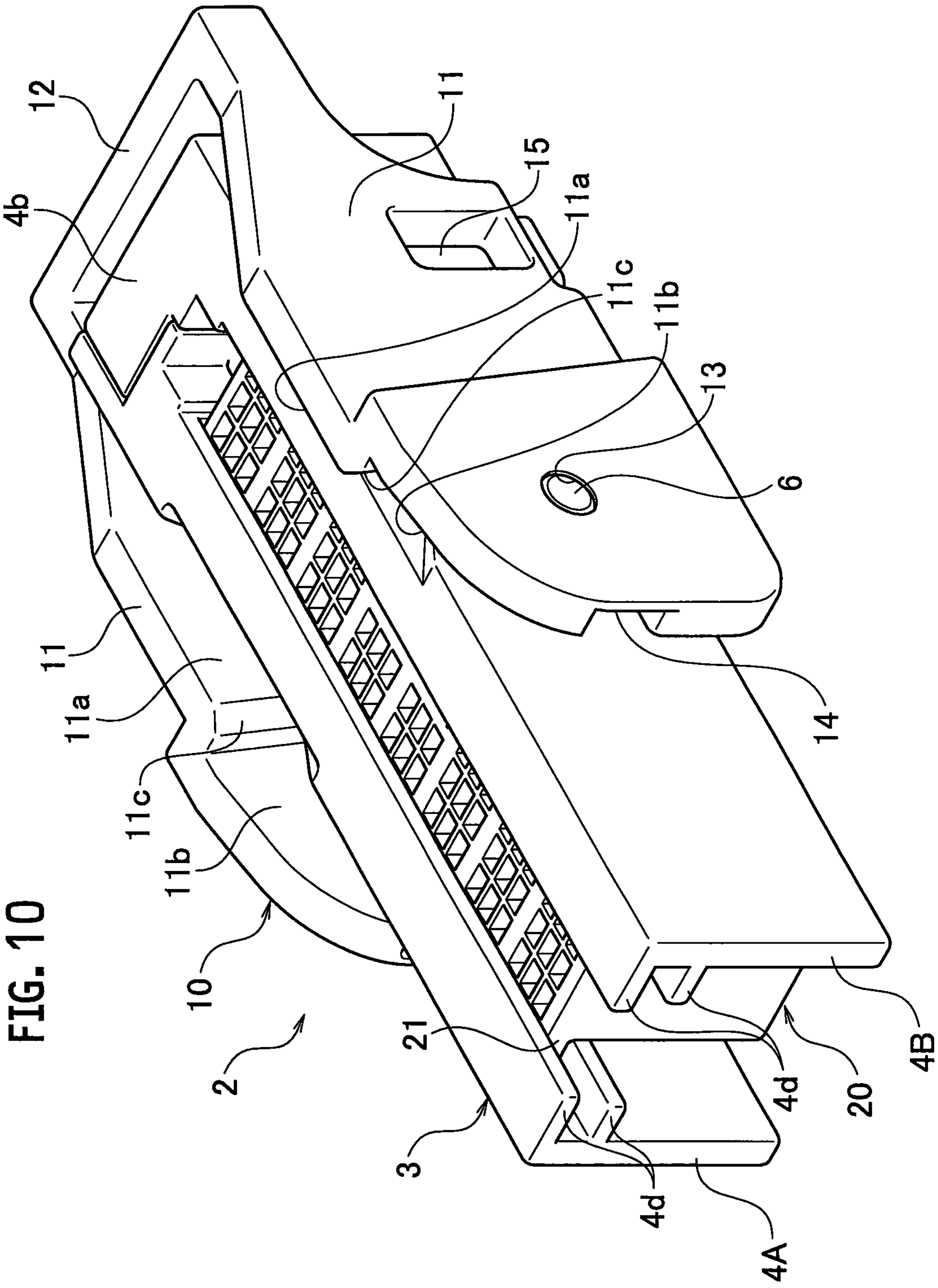
FIG. 10 is a perspective view showing a process of the connector fitting work, showing one embodiment of the present invention.

As shown in FIG. 10, in the fitting-operation start position for the lever body 10, the pair of movable hold parts 4A and 4B is positioned in the holding position so as to hold the female connector 20. This allows the female connector 20 to be positioned by the connector hold portion 3 and not to be detached from the connector hold portion 3. In the fitting-operation start position, the temporary engagement tabs 15 of the lever body 10 are engaged to the temporary engagement holes 7 of the connector hold portion 3, thereby the lever body 10 is temporarily stopped at this position. This is the completion of setting the female connector 20 to the lever jig 2.

Figure 11:
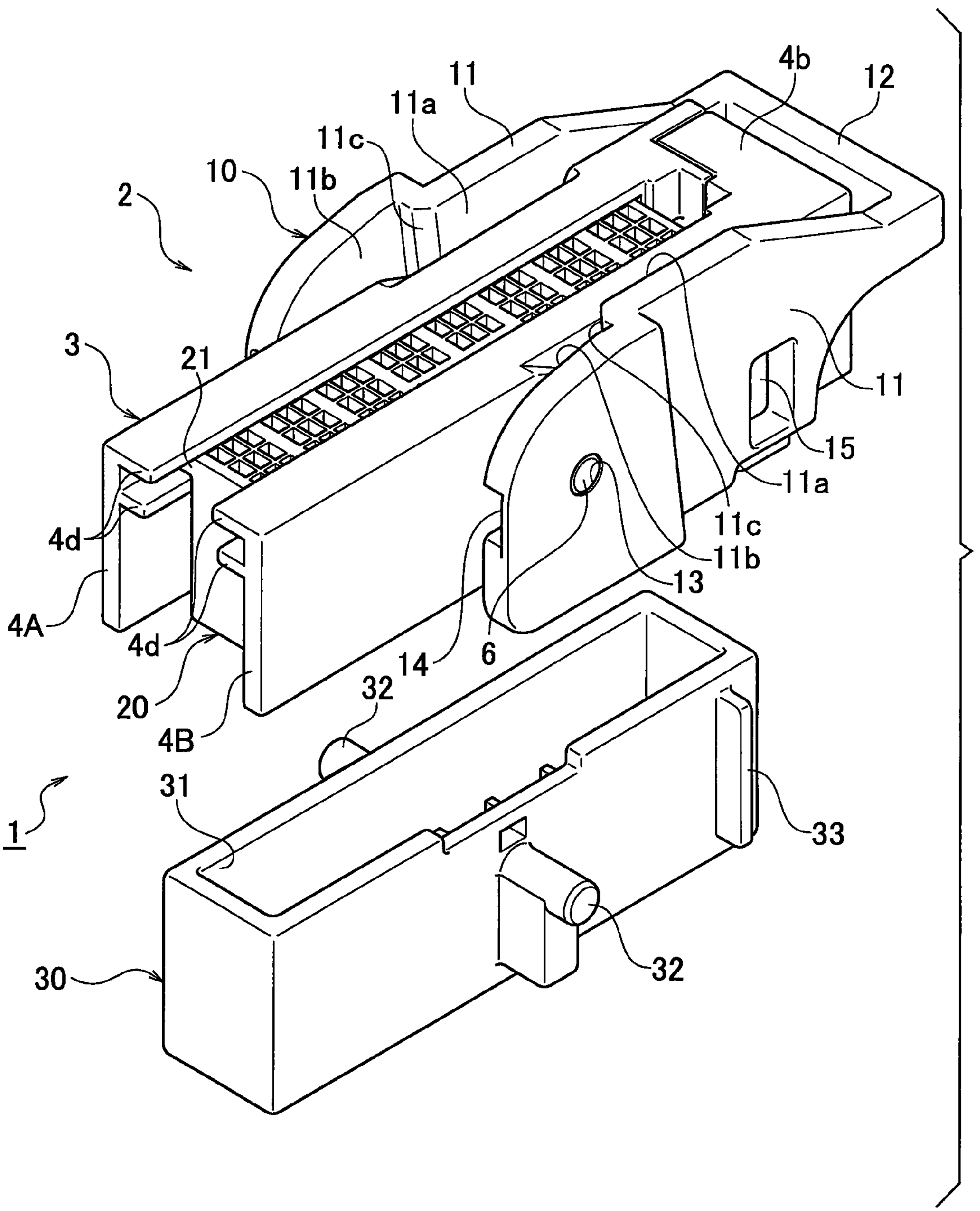
FIG. 11 is a perspective view showing a process of the connector fitting work, showing one embodiment of the present invention.

Next, as shown in FIG. 11, to the connector fit chamber 31 of the male connector 30, the female connector 20 is inserted. With the insertion, the pair of boss parts 32 of the male connector 30 gets into the pair of boss introduction grooves 14 of the lever body 10, thereby the female connector 20 and the male connector 30 are set in the fitting-starting position. The temporary-engagement release guide ribs 33 of the male connector 30 move the temporary engagement tabs 15 of the lever body 10 to a release position, which allows the lever body 10 to be operated.

Figure 12:
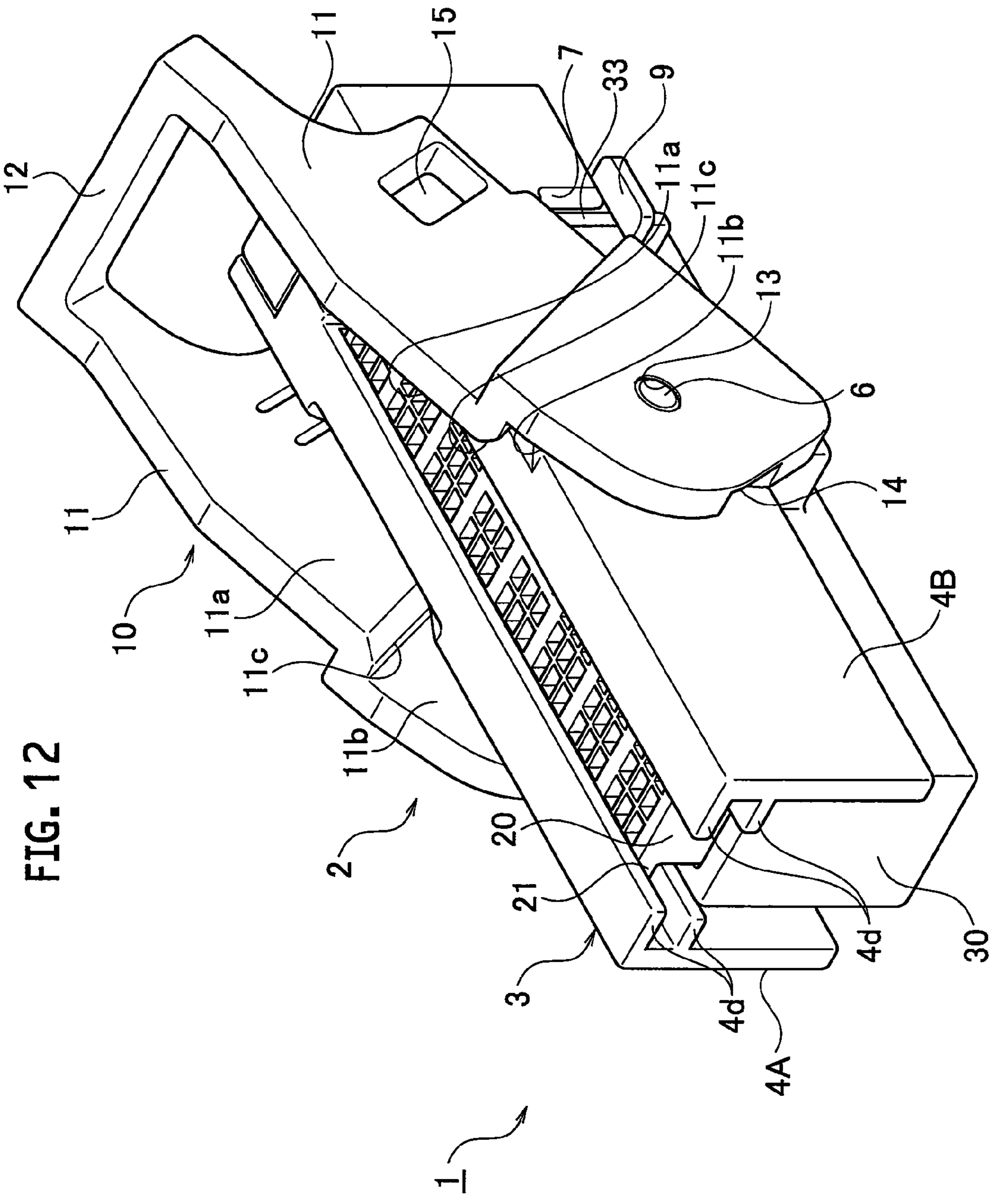
FIG. 12 is a perspective view showing a process of the connector fitting work, showing one embodiment of the present invention.

Next, as shown in FIG. 12, the lever body 10 is operated to rotate from the fitting-operation start position to the side of the fitting-operation completion position. Then the pair of boss parts 32 of the male connector 30 moves through the pair of boss introduction grooves 14 of the lever body 10, thereby the male connector 30 is drawn to the female connector 20. That is, the male connector 30 moves to the fitting position side.

Figure 13:
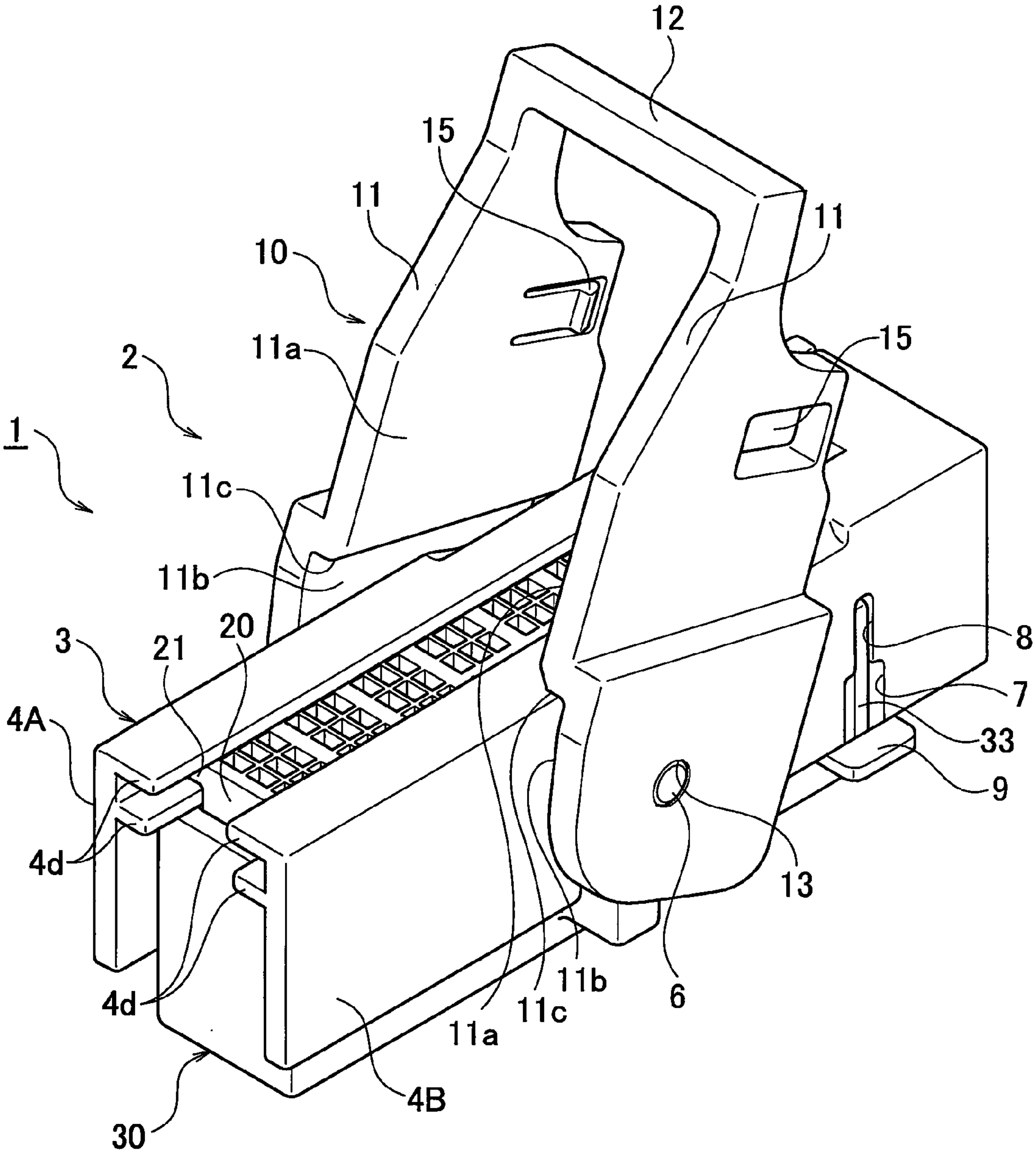
FIG. 13 is a perspective view showing a process of the connector fitting work, showing one embodiment of the present invention.

Here, as the operational position of the lever body 10 comes close to the fitting-operation completion position, an area where the pair of movable hold parts 4A and 4B contacts with the first contact faces 11*a* of the arm part 11 gradually becomes smaller. Then, as shown in FIG. 13, when it comes to the position just before the fitting-operation completion position, the pair of movable hold parts 4A and 4B only has their one edges contact with the first contact faces 11*a*. Still, the pair of movable hold parts 4A and 4B has at least a part contact with the first contact faces 11*a*, so as to receive a restriction from the pair of first contact faces 11*a*, thereby keeping the holding position.

Figure 14:
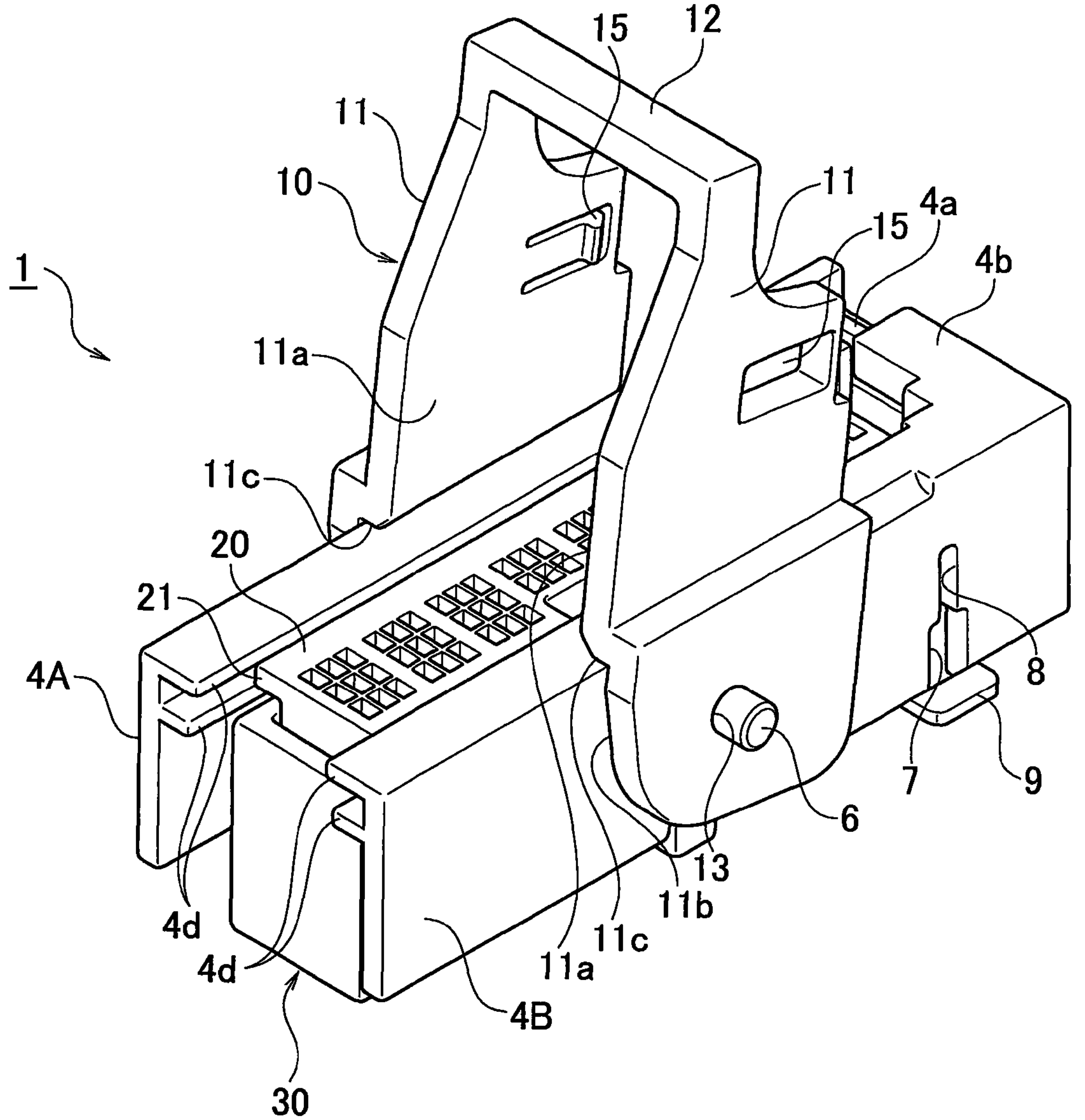
FIG. 14 is a perspective view showing a process of the connector fitting work, showing one embodiment of the present invention.
Figure 15:
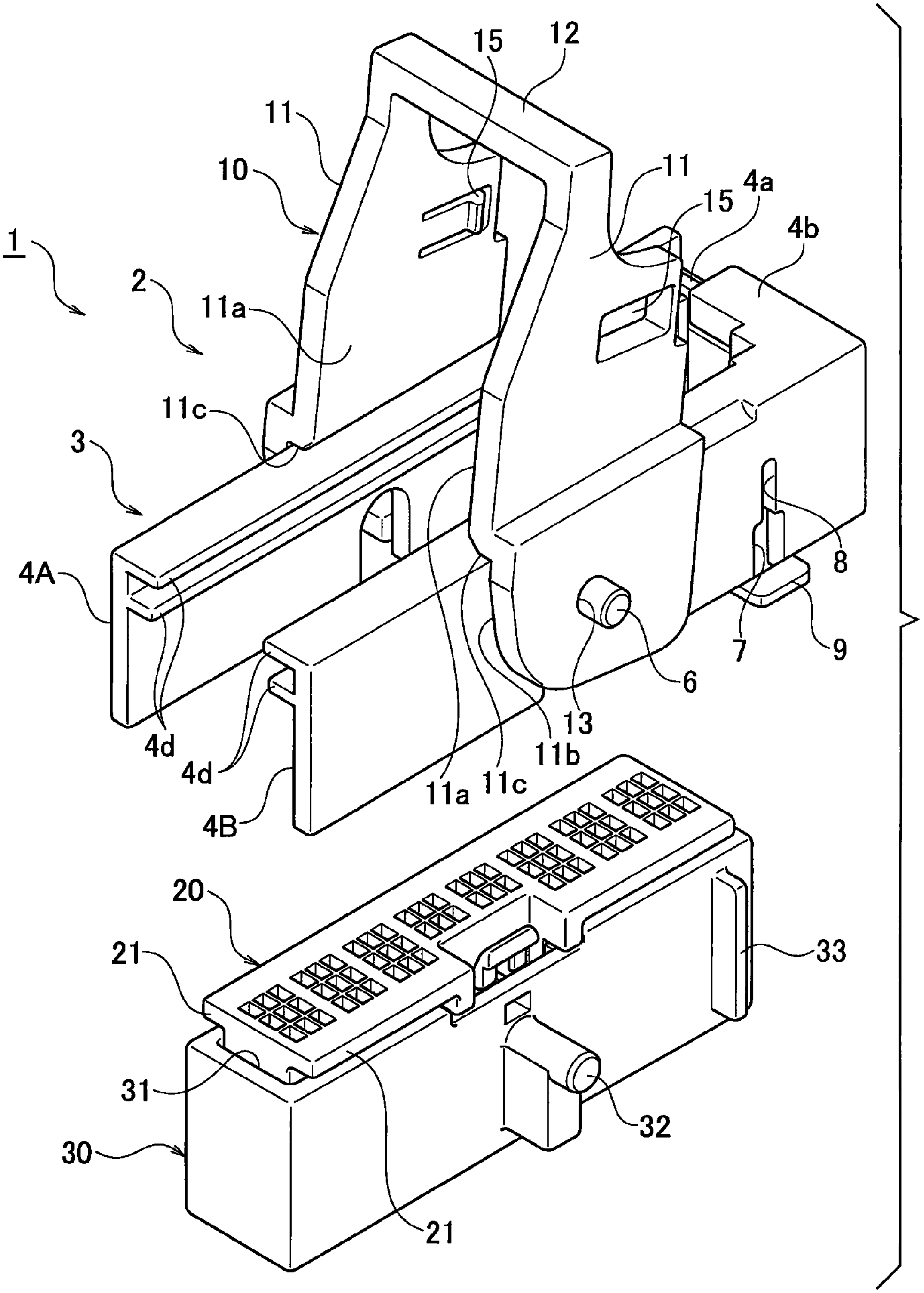
FIG. 15 is a perspective view showing a process of the connector fitting work, showing one embodiment of the present invention.

As shown in FIG. 14, when the lever body 10 is rotated to the fitting-operation completion position, the male connector 30 is drawn to a fitting completion position. Also, when the lever body 10 reaches the fitting-operation completion position, the pair of movable hold parts 4A and 4B first comes off the first contact faces 11*a* of the arm part 11 and moves its contact position to the second contact faces 11*b* by the spring force of the coil spring 5. That is, the pair of movable hold parts 4A and 4B moves to the holding release position first at the fitting-operation completion position for the lever body 10. This allows the lever jig 2 to be detached from the female connector 20. As shown in FIG. 15, the lever jig 2 is detached from the female connector 20, thereby the connector fitting work is completed.

As described above, the lever jig 2 has the connector hold portion 3 which moves between the holding position to hold the female connector 20 and the holding release position to release the female connector 20 from holding, and the lever body 10 which is movably supported by the connector hold portion 3 and operated between the fitting-operation start position and the fitting-operation completion position, wherein the connector hold portion 3 moves in accordance with the operational position of the lever body 10, and in a section between an operation fitting-operation start position and a position just before the fitting-operation completion position for the lever body 10, the connector hold portion 3 moves to the holding position and in the fitting-operation completion position for the lever body 10, the connector hold portion 3 moves to the holding release position.

Accordingly, the lever body 10 of the lever jig 2 is operated from the fitting-operation start position to the fitting-operation completion position, and during the operation from the fitting-operation start position to the position just before the fitting-operation completion position the connector hold portion 3 keeps the holding position and only after the operation is completed in the fitting-operation completion position the connector hold portion 3 moves to the holding release position, thereby allowing the lever jig 2 to be detachable from the female connector. Accordingly, when the female connector 20 and the male connector 30 are in a half-fitted state, the detachment is not possible, thereby surely preventing the detachment in a half-fitted state between the female connector 20 and the male connector 30.

The connector hold portion 3 has the pair of movable hold parts 4A and 4B which moves between the holding position with a narrowed distance between each other and the holding release position with a broadened distance between each other and the coil spring 5 as an urging means, which urges the pair of movable hold parts 4A and 4B to the holding release position side, and the lever body 10 has the pair of arm parts 11 which is rotatably supported by the pair of movable hold parts 4A and 4B both in the holding position and in the holding release position, wherein the pair of arm parts 11 has the first contact faces 11*a* and the second contact faces 11*b* formed thereon, to both of which the pair of movable hold parts 4A and 4B comes into contact respectively by the action of spring force of the coil spring 5, wherein in a section between the fitting-operation start position and the position just before the fitting-operation completion position for the pair of arm parts 11, the pair of movable hold parts 4A and 4B contacts with the first contact faces 11*a* to keep the holding position, and in the fitting-operation completion position for the pair of arm parts 11, the pair of movable hold parts 4A and 4B contacts with the second contact faces 11*b*, thereby moving from the holding position to the holding release position. Accordingly, the structure for moving the connector hold portion 3 in accordance with the operational position of the lever body 10 is realized by a less number of parts, which are the pair of movable hold parts 4A and 4B, the coil spring 5 as the urging means and the pair of arm parts 11, and a simple configuration.

On completion of the fitting work of the lever jig 2, as shown in FIG. 15, the lever body 10 is located in the fitting-operation completion position. In the fitting-operation completion position for the lever body 10, the pair of movable hold parts 4A and 4B has their upper ends contact with the difference faces 11*c* of the pair of arms 11, so that the pair of arm parts 11 is temporarily locked at the fitting-operation completion position. Accordingly, it is convenient for the next connector fitting work.

What is claimed is:

1. A lever jig which is mounted on one of a pair of connectors and causes fitting force to act on the pair of connectors by an operation from a fitting-operation start position to a fitting-operation completion position so as to move the pair of connectors from a fitting start position to a fitting completion position, the lever jig comprising:

a connector hold portion that moves between a holding position to hold one of the connectors and a holding release position to release one of the connectors from holding; and a lever body that is movably supported by the connector hold portion and operated between the fitting-operation start position and the fitting-operation completion position, wherein the connector hold portion moves in accordance with an operational position of the lever body, and in a section between the fitting-operation start position and a position just before the fitting-operation completion position for the lever body the connector hold portion moves to the holding position and in the fitting-operation completion position for the lever body the connector hold portion moves to the holding release position, wherein the connector hold portion includes a pair of movable hold parts that moves between the holding position with a narrowed distance between each other and the holding release position with a broadened distance between each other, and an urging means to urge the pair of movable hold parts to the side of the holding release position.

2. The lever jig according to claim 1, wherein the lever body has a pair of arm parts movably supported by the pair of movable hold parts, respectively, both in the holding position and in the holding release position, and the pair of arm parts has first contact faces and second contact faces formed thereon, respectively, to which the pair of movable hold parts comes into contact by the action of urged force of the urging means, wherein in a section between the fitting-operation start position and the position just before the fitting-operation completion position for the pair of arm parts, the pair of movable hold parts contacts with the first contact faces to keep the holding position, and in the fitting-operation completion position for the pair of arm parts, the pair of movable hold parts contacts with the second contact faces, thereby moving from the holding position to the holding release position.

3. The lever jig according to claim 1, wherein each of the pair of movable hold parts includes protruding clamp parts for clamping onto a portion of the one of the pair of connectors.

4. A connector apparatus comprising:

a pair of connectors to be mutually fittable; and a lever jig which is mounted on one of the pair of connectors and causes fitting force to act on the pair of connectors by an operation from an operation start position to an operation completion position so as to move the pair of connectors from a fitting start position to a fitting completion position, wherein one of the connectors is provided to be held by the lever jig and detached from a held state, wherein the lever jig includes a connector hold portion that moves between a holding position to hold one of the connectors and a holding release position to release one of the connectors from holding, and a lever body that is movably supported by the connector hold portion and operated between a fitting-operation start position and a fitting-operation completion position, wherein the connector hold portion moves in accordance with an operational position of the lever body, and in a section between the fitting-operation start position and a position just before the fitting-operation completion position for the lever body the connector hold portion moves to the holding position and in the fitting-operation completion position for the lever body the connector hold portion moves to the holding release position wherein the connector hold portion includes a pair of movable hold parts that moves between the holding position with a narrowed distance between each other and the holding release position with a broadened distance between each other, and an urging means to urge the pair of movable hold parts to the side of the holding release position.

5. The connector apparatus according to claim 4, wherein the lever body has a pair of arm parts movably supported by the pair of movable hold parts, respectively, both in the holding position and in the holding release position, and the pair of arm parts has first contact faces and second contact faces formed thereon, respectively, to which the pair of movable hold parts comes into contact by the action of urged force of the urging means, wherein in a section between the fitting-operation start position and the position just before the fitting-operation completion position for the pair of arm parts, the pair of movable hold parts contacts with the first contact faces to keep the holding position, and in the fitting-operation completion position for the pair of arm parts, the pair of movable hold parts contacts with the second contact faces, thereby moving from the holding position to the holding release position.

6. The connector apparatus according to claim 4, wherein each of the pair of movable hold parts includes protruding clamp parts for clamping onto a portion of the one of the pair of connectors.

7. A lever jig which is mounted on one of a pair of connectors and causes fitting force to act on the pair of connectors by an operation from a fitting-operation start position to a fitting-operation completion position so as to move the pair of connectors from a fitting start position to a fitting completion position, the lever jig comprising:

a connector hold portion that moves between a holding position to hold one of the connectors and a holding release position to release one of the connectors from holding; and a lever body that is movably supported by the connector hold portion and operated between the fitting-operation start position and the fitting-operation completion position, wherein the connector hold portion moves in accordance with an operational position of the lever body, and in a section between the fitting-operation start position and a position just before the fitting-operation completion position for the lever body the connector hold portion moves to the holding position and in the fitting-operation completion position for the lever body the connector hold portion moves to the holding release position, wherein the connector hold portion includes a pair of movable hold parts that moves between the holding position with a narrowed distance between each other and the holding release position with a broadened distance between each other, and a coil spring positioned to urge the pair of movable hold parts to the side of the holding release position.

8. The lever jig according to claim 7, wherein the lever body has a pair of arm parts movably supported by the pair of movable hold parts, respectively, both in the holding position and in the holding release position, and the pair of arm parts has first contact faces and second contact faces formed thereon, respectively, to which the pair of movable hold parts comes into contact by the action of urged force of the urging means, wherein in a section between the fitting-operation start position and the position just before the fitting-operation completion position for the pair of arm parts, the pair of movable hold parts contacts with the first contact faces to keep the holding position, and in the fitting-operation completion position for the pair of arm parts, the pair of movable hold parts contacts with the second contact faces, thereby moving from the holding position to the holding release position.

9. The lever jig according to claim 7, wherein each of the pair of movable hold parts includes protruding clamp parts for clamping onto a portion of the one of the pair of connectors.

* * * * *